United States Patent [19]
Furbee et al.

[11] Patent Number: 5,347,571
[45] Date of Patent: Sep. 13, 1994

[54] X-RAY TUBE ARC SUPPRESSOR

[75] Inventors: Avery D. Furbee, Elmhurst; Lester Miller, Forest Park; Carl F. Bauer, Chicago, all of Ill.

[73] Assignee: Picker International, Inc., Highland Hts., Ohio

[21] Appl. No.: 957,219

[22] Filed: Oct. 6, 1992

[51] Int. Cl.$^5$ .............................. H05G 1/10
[52] U.S. Cl. .................... 378/105; 378/101; 378/106
[58] Field of Search ............ 378/101, 105, 106, 107

[56] References Cited

U.S. PATENT DOCUMENTS

| | | |
|---|---|---|
| 3,099,789 | 7/1963 | Perrins . |
| 3,588,510 | 6/1971 | Gager . |
| 4,816,741 | 3/1989 | Ekstrand ........................ 363/89 |
| 4,853,946 | 8/1989 | Elliott et al. . |
| 5,132,999 | 7/1992 | Wirth ........................... 378/101 |

FOREIGN PATENT DOCUMENTS

| | | |
|---|---|---|
| 0267568 | 5/1988 | European Pat. Off. . |
| 0421720 | 4/1991 | European Pat. Off. . |
| 0497517 | 8/1992 | European Pat. Off. . |
| 4040247 | 6/1992 | Fed. Rep. of Germany . |
| 62-278798 | 12/1987 | Japan . |
| 2014807 | 8/1979 | United Kingdom . |

OTHER PUBLICATIONS

"Solenoid Selection and Protection", Coughlin, Design Engineering, vol. 51, No. 4, Oct. 1, 1980, pp. 45–48.

*Primary Examiner*—Craig E. Church
*Attorney, Agent, or Firm*—Fay, Sharpe, Beall, Fagan, Minnich & McKee

[57] ABSTRACT

A high frequency voltage generator (10) produces a high positive voltage and a high negative voltage. A parallel connected coil (26) and diode (30) are connected between the high voltage supply and a target (44) of an x-ray tube (40). A second parallel connected coil (28) and diode (32) are connected between the negative voltage and an electron source (42) of the x-ray tube. The coils are preferably a multiple pancake design (FIG. 3). When the tube starts to arc, the sudden increase in current flow through the coil is converted and stored in a magnetic field leaving only a small current to contribute to arcing. The coils are sized such that the current which passes to the x-ray tube is sufficiently small that the arcing is usually extinguished without an avalanche phenomenon occurring. The diodes permit the energy stored in the magnetic field to be converted into a current flow through the coil and diode such that the energy is dissipated as heat by the inherent electrical resistance of the coil with only a minimal amount of the energy passing over time to the x-ray tube.

12 Claims, 3 Drawing Sheets

X-RAY TUBE ARC SUPPRESSOR

BACKGROUND OF THE INVENTION

The present invention relates to the arc suppression art. It finds particular application in conjunction with suppressing arcing of x-ray tubes in CT scanners operating at high voltages, and will be described with particular reference thereto. However, it is to be appreciated that the present invention will also find application in connection with x-ray tubes for other applications, and the like.

An x-ray tube commonly has a source filament which is heated to boil-off electrons and a target which emits x-rays when bombarded by a beam of the electrons. An electronic power supply provides a high voltage across the electron source and the target in order to draw the electrons towards the target in a beam with sufficient energy to cause the generation of x-rays. Conventionally, the power supply includes electronic controls for selecting the potential applied between the source and the target, known as the kV, and the milliamperes of current flowing between the target and the anode, commonly known as the mA. Typically, the x-ray tube of a high performance CT scanner has about 150 kV applied across the source and the target and controls the tube current between about 15–400 mA.

As might be expected, when two elements with 150 kV difference in potential are placed proximate to each other, there is a tendency to arc. In x-ray tubes, this tendency to arc often increases as the tube ages due to such factors as a degradation of the vacuum within the tube. When the x-ray tube arcs, a current on the order of hundreds of amperes can flow between the source and the anode. Once an x-ray tube starts to arc, an avalanche type effect occurs sputtering metal and the metal atoms as well as ionizing the contaminants in the vacuum, reducing resistance, and allowing the current to build very rapidly, on the order of microseconds, to hundreds of amperes where generators of high output capacitance are used. The arcing problem can be exaggerated with high frequency multiplier type generators, as are commonly used on high performance high voltage x-ray tubes since these generators, by necessity, are high capacitance type.

Typically, the electron source or cathode filament is connected with a −75 kV output of the generator and the anode target is connected with a +75 kV output of the generator. In this manner, a 150 kV potential is maintained between the source and the anode, yet each is at a potential of only 75 kV relative to ground.

In order to limit arcing, others have placed a resistor between the negative output of the generator and the electron source and another resistor between the positive output of the generator and the anode target. If the resistor is too large, there is a significant drop in the potential between the electron source and the anode target. If the resistor is too small, it has a negligible effect on arcing. An acceptable value for the resistance is about 350 Ohms. A 350 Ohm resistor in a 150 kV generator limits the arc current to about 210 amps (75,000 V/350 Ω). A current of this magnitude is not only detrimental to the x-ray tube, but produces a distinct discontinuity in the production of x-rays. In a CT scan, several views of bad or missing data result.

The inventors herein have determined that by limiting the arcing current at the beginning of an arc, the avalanche type effect can be avoided, and severe arcing can be minimized.

SUMMARY OF THE INVENTION

In accordance with the present invention, an inductive load is placed between the x-ray tube and the high voltage generator. When there is a sudden increase in current flow, as is found in arcing, the inductor stores electrical energy, minimizing the passed current. A means is provided for dissipating the energy stored in the inductor without passing it through the x-ray tube.

In accordance with a more limited aspect of the present invention, the means for dissipating the energy stored in the inductor includes a diode connected in parallel with the inductive load.

In accordance with another more limited aspect of the present invention, the inductive load includes a multiple pancake coil assembly.

In accordance with another aspect of the present invention, the inductive load includes a ferrite core to increase its inductive storage capacity without increasing electrical resistance.

One advantage of the present invention is that it limits arcing.

The present invention reduces internal damage to x-ray tubes attributable to arcing, including less disturbance to target electrode surfaces, less gas generation, and reduced sputtering on internal parts.

The present invention prolongs x-ray tube life and stability.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
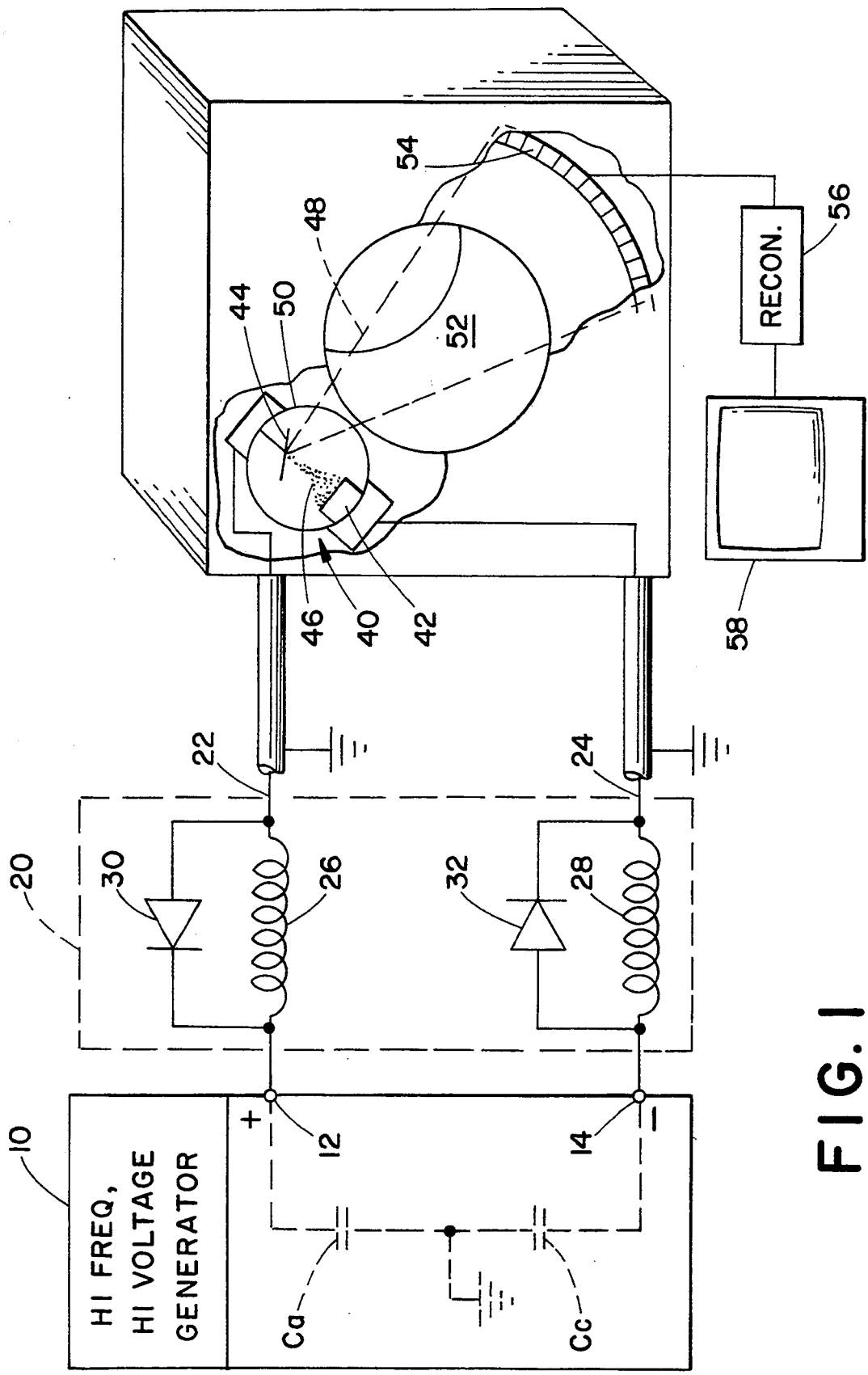
FIG. 1 is a circuit diagram of a voltage generator equivalent circuit, CT scanner, x-ray tube, and arcing suppression device in accordance with the present invention.

With reference to FIG. 1, a high frequency multiplier type generator 10 produces a high voltage output, e.g. +75 kV at a first or anode output 12 and −75 kV at a second or cathode output 14. The high frequency voltage generator 10, which is of conventional construction, has an equivalent circuit of a capacitor. More specifically, the generator has an effective capacitance $C_a$ between ground and the first or anode output 12 and a capacitance $C_c$ between ground and the second or cathode output 14.

In the illustrated embodiment, an arc suppressor means 20 is connected with the anode and cathode outputs. However, it is to be appreciated, that the arc suppression means may be incorporated within the high frequency voltage generator such that output 22 and 24 of the arc suppression means are outputs of an arc suppressing high voltage generator. The arc suppressing means includes an inductive load 26 connected with the anode and an inductive load 28 connected with the cathode. Inductive loads convert and store electric current energy to magnetic fields during changing current flow, i.e. dI/dt. Other means which store energy during sudden current changes may also be utilized. A means 30 discharges energy stored in the magnetic field of the first inductive load 26. In the preferred embodiment, the energy discharge means 30 is a high voltage diode connected in parallel with the inductive load. The high voltage diode allows the energy stored in the inductive coil to be fed back therethrough using the inherent resistance of the inductor to dissipate the energy. Alternately, a resistor may be placed in series with the high voltage diode. An analogous energy dissipating means 32 is connected with the second inductive load 28. Again, the second energy discharging means 32 is preferably a high voltage diode connected in parallel with the inductive load 28.

The outputs 22, 24 are connected by high voltage cable 34, 36 with an x-ray tube 40. The x-ray tube includes an x-ray source 42 such as a filament which is heated by a filament heating current from a filament current source (not shown). The heated filament generates a cloud of electrons which are drawn to a target electrode or anode 44 by the potential applied by the high voltage generator 10 across the electron source and the target to form an electron beam 46. When the electron beam 46 impacts the target, a beam of x-rays 48 is generated. The anode and an electron source are sealed in a vacuum envelope 50.

In a CT scanner, the x-ray tube 40 is mounted for rotation about a patient receiving examination region 52. The x-ray beam 48 is collimated to conform to the examination region and impact x-ray detectors 54 on the other side. From the intensity of x-rays detected by each detector and the angular orientation of the x-ray tube, a reconstruction means 56 reconstructs an image representation of the portion of a patient in the examination region. The image representation may be stored in computer memory, displayed on a video monitor 58, or the like.

Figure 2:
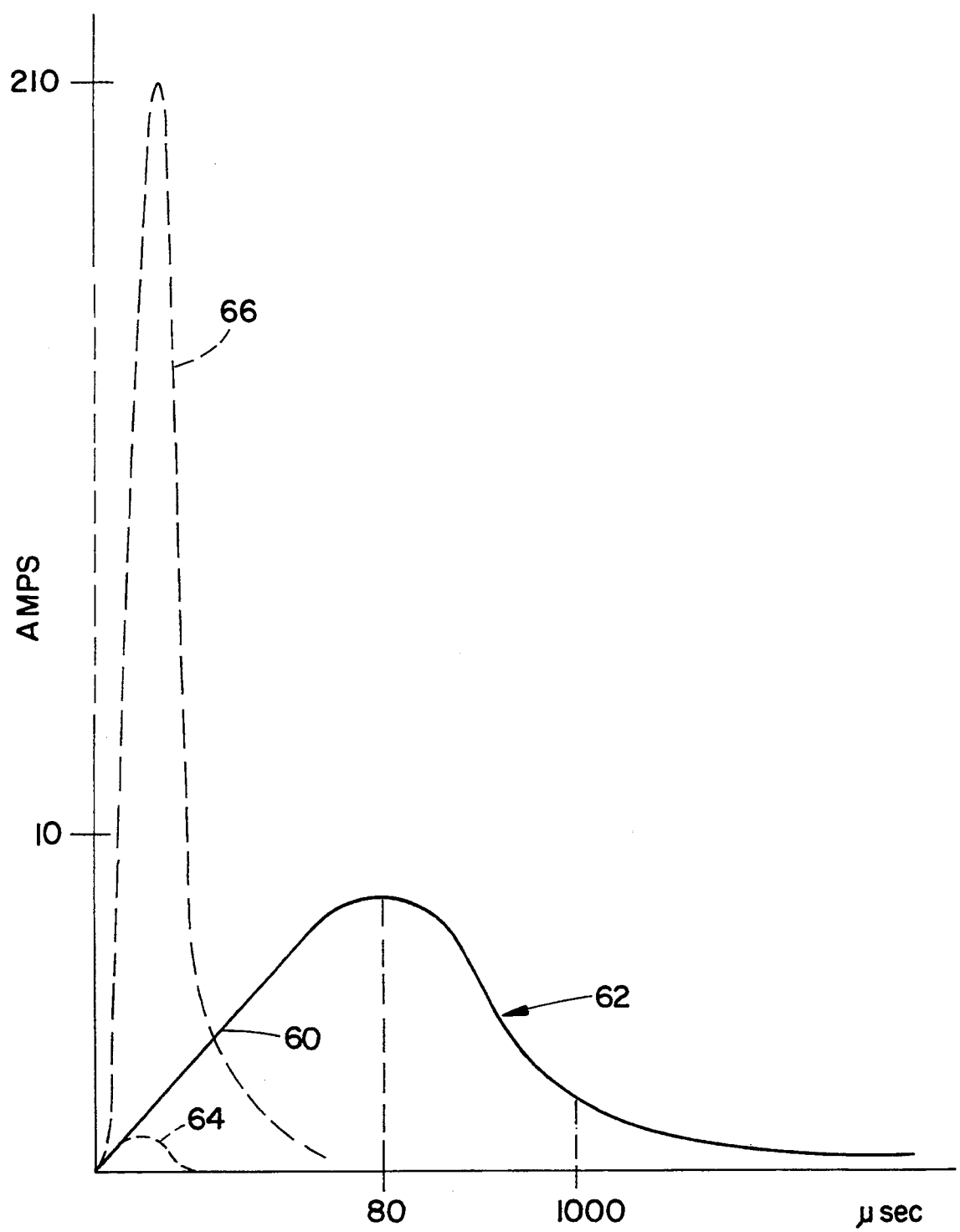
FIG. 2 is a graphical depiction of arcing current versus time.

With reference to FIG. 2, when the x-ray tube 40 starts to arc, the current through the arc suppression means 20 starts to rise rapidly 60. The inductors 26, 28 absorb and store this energy so efficiently that after about 80 µsec, a current amplitude of only about 8 amps is reached using an inductor of approximately $\frac{1}{8}$ Henry. The energy stored in the inductive loads are discharged through the diodes 30, 32 causing the current which is passed to outputs 22, 24 to diminish at least to the current amplitude illustrated by curve 62 and often much less, e.g. to tube tick 64. Because arcing is often an avalanche phenomenon, limiting the current at the beginning of the arc limits ionization within the vacuum envelope 50 and other phenomenon which would decrease the resistance between the x-ray source and the target. When the current is limited sufficiently, the avalanche phenomenon does not occur, and only a harmless tube tick 64 occurs rather than a full-blown tube arc 66.

Figure 3:
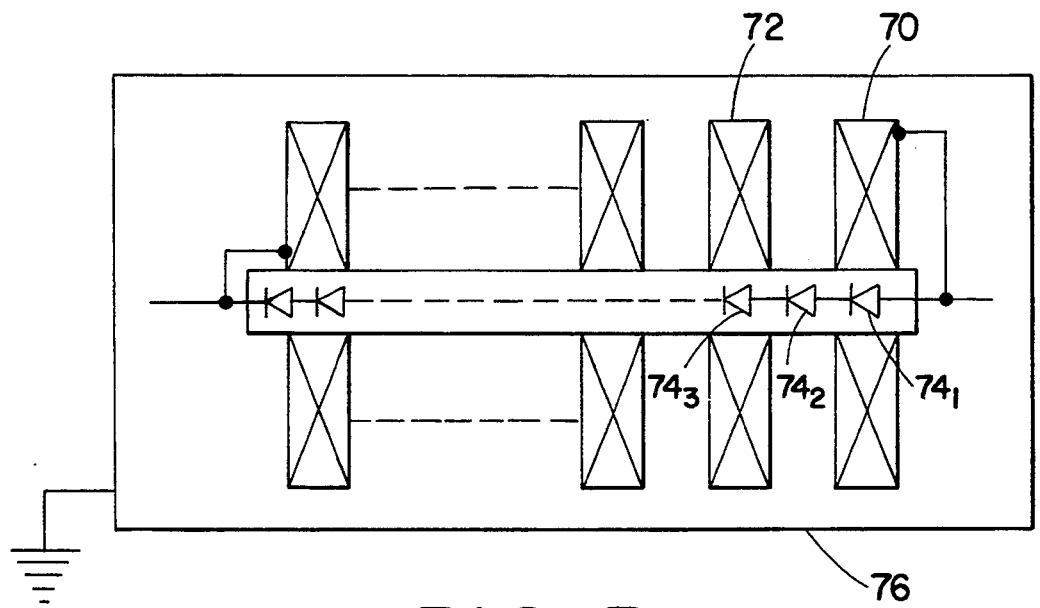
FIG. 3 is a side sectional diagrammatic view of a preferred pancake type inductor for suppressing arcing in conjunction with the present invention; and, FIG. 4 illustrates an alternate embodiment of the multiple pancake inductor with a ferrite core.

With reference to FIG. 3, each of the inductive loads preferably includes a multiple pancake coil configuration. This configuration permits the required large inductance to be obtained in a small space and, importantly, minimizes the shunt capacitance around the inductor which would reduce the inductor which would reduce the inductive effect of the coil. That is, a first coil 70 is wound from the inner diameter towards the outer diameter. The winding continues to a second coil 72 which is again wound from the inner diameter towards the outer diameter. The two coils are spaced a short distance apart. Similarly, additional coils are mounted in axial alignment, each wound from the inside out and spaced from the preceding coil. For space compactness, the high voltage diode means 30, 32, preferably a plurality of diodes $74_1$, $74_2$, . . . for higher voltage capacity, are mounted along the core of the pancake coils 70, 72, etc. The coil and diode assembly is housed in a tank 76 which is filled with a dielectric oil. Alternately, the coil and diode assembly are potted in a suitable dielectric resin material and the assembly shielded with a grounded conductive outer sheath.

Figure 4:
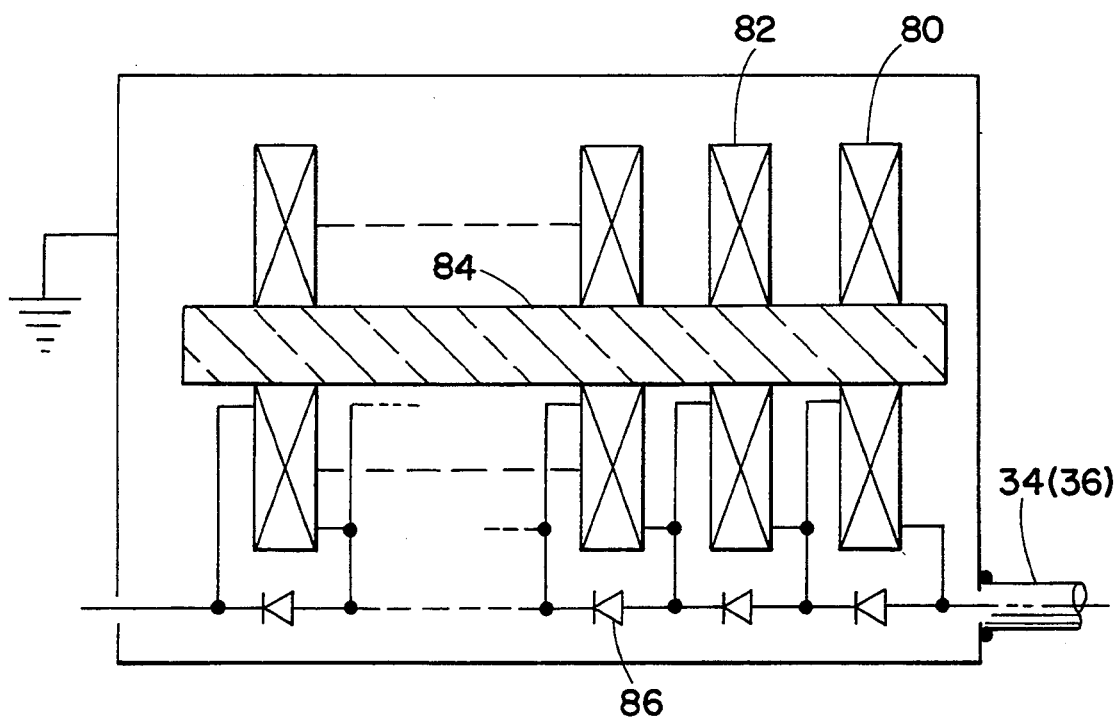

With reference to FIG. 4, the inductive coil assembly again has a series of coils 80, 82, etc. each wound from the inside out and spaced from each other. A ferrite core 84 extends through the core or inner diameter of the coils. One or more diodes 86 are connected in series with the coils. The coil, ferrite core and diode assembly are potted in a suitable dielectric polymeric material. A grounding sheath 88 surrounding the assembly is electrically connected with the grounding sheath of the associated high voltage leads 34, 36.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A power supply for an x-ray tube of an x-ray diagnostic scanner, the power supply comprising:
   a high frequency voltage supply means for supplying a high frequency rectified voltage;
   an arc suppressor means connected with the high frequency voltage supply means, the arc suppressing means including:
   an inductive load which stores energy during a sudden current rise associated with x-ray tube arcing, the inductive load including a plurality of coils arranged at spaced intervals along a central axis,
   a means connected with the inductive load for dissipating the stored energy;
   an x-ray tube which is connected with the inductive load of the arc suppressing means.

2. The power supply as set forth in claim 1 further including a ferrite material disposed along the central axis of the coils.

3. The power supply as set forth in claim 1 wherein each of the coils is wound from the central axis out.

4. The power supply as set forth in claim 1 wherein the energy dissipating means includes at least one diode disposed along the central axis of the coils and connected electrically in parallel therewith.

5. The power supply as set forth in claim 4 wherein the coil and diode assembly is potted in a dielectric material.

6. A power supply comprising:

a means for generating a high frequency voltage;

an inductive load which stores energy during a sudden increase in current flow from the high frequency generator means associated with x-ray tube arcing, the inductive load including a plurality of coils arranged at spaced intervals along a central axis; and a means connected with the inductive load for dissipating the stored energy.

7. The power supply as set forth in claim 6 wherein the energy dissipating means includes at least one high voltage diode connected electrically in parallel with the inductive load.

8. The power supply as set forth in claim 6 wherein each of the coils is wound from the central axis out.

9. The power supply as set forth in claim 6 wherein the high frequency high voltage generator means has an anode output and a cathode output and wherein the energy storing means includes:

a first inductive load connected between the anode output and a target of an x-ray tube, a second inductive load connected between the cathode output and an electron source of the x-ray tube, and a means for dissipating energy in the first and second coil assemblies connected therewith.

10. The power supply as set forth in claim 6 further including a ferrite material disposed along the central axis of the coils.

11. The power supply as set forth in claim 6 wherein the energy dissipating means includes at least one diode disposed along the central axis of the coils and connected electrically in parallel therewith.

12. The power supply as set forth in claim 11 wherein the coil and diode assembly is potted in a dielectric material.

* * * * *